(12) United States Patent
Kolp et al.

(10) Patent No.: US 7,931,282 B2
(45) Date of Patent: Apr. 26, 2011

(54) AUTOMATICALLY VARIABLE RIDE HEIGHT ADJUSTMENT APPARATUS

(75) Inventors: Scott A. Kolp, Clarkston, MI (US); Michael L. Bailey, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 12/487,747

(22) Filed: Jun. 19, 2009

(65) Prior Publication Data

US 2010/0320704 A1 Dec. 23, 2010

(51) Int. Cl.
*B60G 17/04* (2006.01)
(52) U.S. Cl. ................................... 280/5.514
(58) Field of Classification Search ............... 280/5.514, 280/5.515, 5.516, 5.509, 124.103, 124.106, 280/124.107
See application file for complete search history.

(56) References Cited

U.S. PATENT DOCUMENTS

| 2,901,241 A | | 8/1959 | Lautzenhiser et al. |
| 3,897,844 A | * | 8/1975 | Chevalier ...................... 180/345 |
| 3,964,764 A | * | 6/1976 | Rickardsson .......... 280/124.116 |
| 4,671,535 A | * | 6/1987 | Hanson et al. ......... 280/124.104 |
| 6,170,242 B1 | * | 1/2001 | Gordon ........................... 56/15.8 |
| 6,371,466 B1 | * | 4/2002 | Spears .......................... 267/265 |

* cited by examiner

*Primary Examiner* — Faye M. Fleming

(57) ABSTRACT

An automatically variable vehicle ground clearance for motor vehicles with semi-elliptical spring suspensions. A drive member is placed at each wheel corner to be height adjusted, the drive member being motor driven. An operator may select a height preference by operation of a switch, or a controller may provide a range of height selections based upon an algorithm which is responsive to sensed vehicle ride conditions, as for example vehicle speed, to optimize vehicle performance.

18 Claims, 4 Drawing Sheets

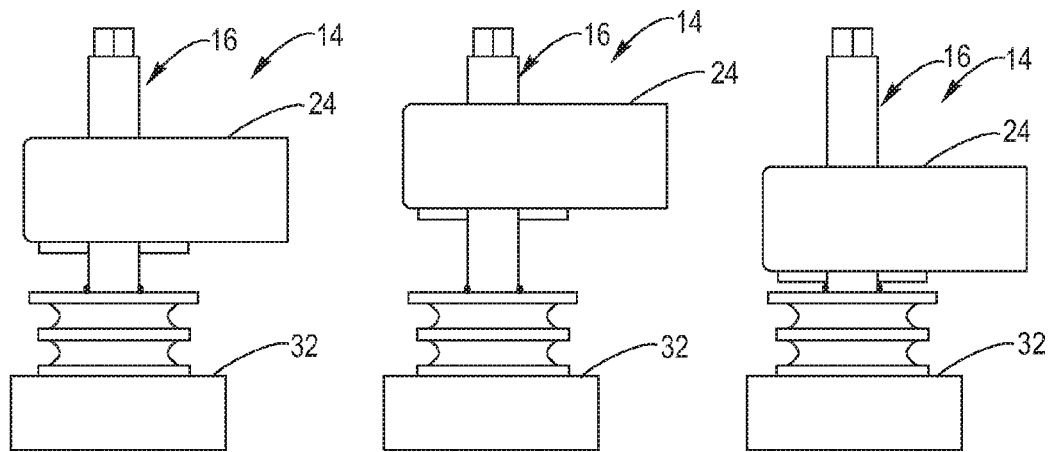
*Prior Art*
*Fig. 2A*
*Prior Art*
*Fig. 2B*
*Prior Art*
*Fig. 2C*
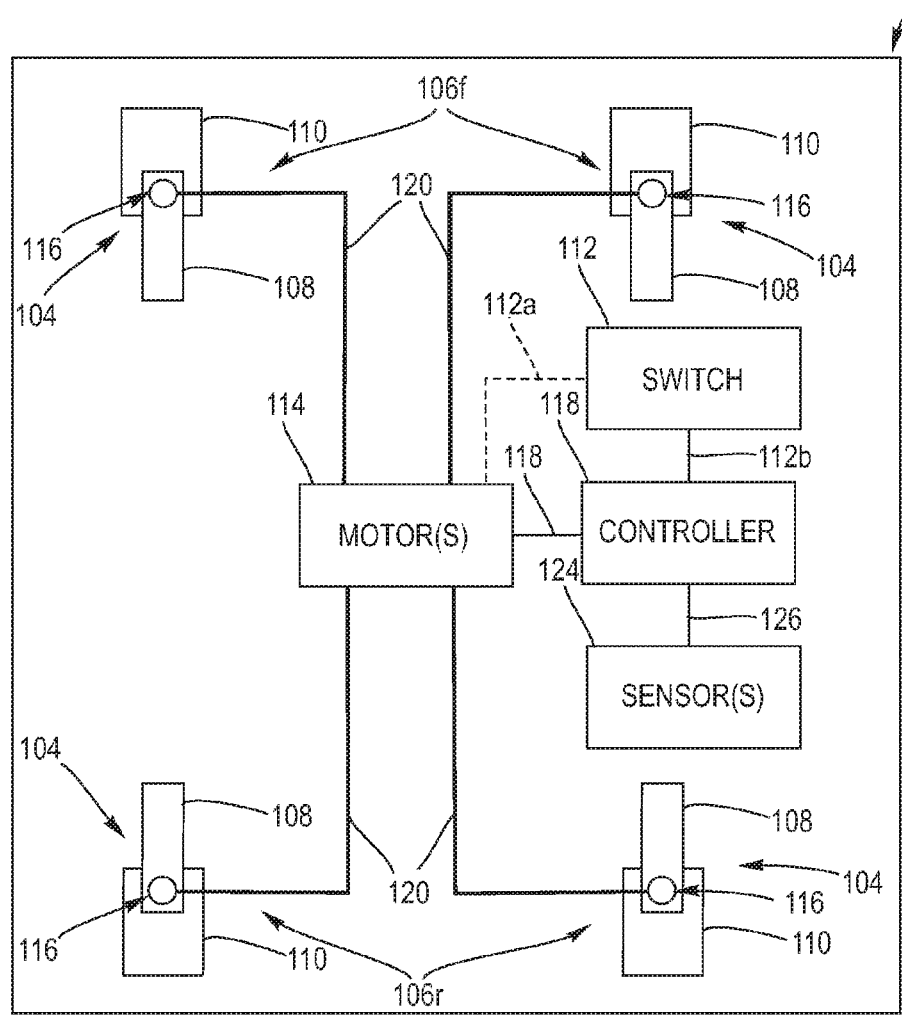
*Fig. 3*

AUTOMATICALLY VARIABLE RIDE HEIGHT ADJUSTMENT APPARATUS

TECHNICAL FIELD

The present invention relates to manually variable ride height adjustment apparatus for use with semi-elliptical spring suspensions of motor vehicles, and more particularly to an automatically variable ride height adjustment apparatus for use with semi-elliptical spring suspensions.

BACKGROUND OF THE INVENTION

Ride height adjustment of a motor vehicle equipped with a semi-elliptical spring suspension is accomplished by raising or lowering a distal end of a semi-elliptical spring relative to a suspension attachment member, as for example a control arm. Adjustable ride height allows, on the one hand, the motor vehicle to be lowered relative to the ground to improve aerodynamics and fuel economy, and, on the other hand, raised to clear driveway ramp angles so as to prevent underbody or front end damage in everyday driving.

As illustrated in FIGS. 1 through 2C, a wheel corner 10 features a semi-elliptical spring suspension 12 which includes a manually variable ride height adjustment apparatus 14. The manually variable ride height adjustment apparatus 14 utilizes a threaded stud 16 with a multi-faced drive head 16a, wherein stud threads 18 are threadably engaged with a threaded spring collar 20 connected to a distal end 24e of the elliptical spring 24 at an aperture 24a formed therein. A base 26 of the threaded stud is welded to a pad collar 28 connected with a spring tip pad 30, which is, in turn, connected to a suspension attachment member 32, as for example a control arm.

In operation of the manually variable ride height adjustment apparatus 14, to adjust from a medial position of the distal end of the semi-elliptical spring 24 with respect to the suspension attachment member 32 (FIG. 2A), a wrench (not shown) is interfaced with the multi-faced drive head 16a, and the threaded stud 16 rotated: if turned in one direction, the distal end of the elliptical spring 24 is moved away from the suspension attachment member 32, thereby raising the vehicle with respect to ground level (FIG. 2B); whereas, if turned in the opposite direction, the distal end of the elliptical spring is moved closer to the suspension attachment member, thereby lowering the vehicle with respect to ground level (FIG. 2C).

In the prior art it is known to provide ride height adjustment of motor vehicle suspension utilizing variably pressurized air suspension components, such as for example air springs. An example of air springs is disclosed in U.S. Pat. No. 2,901,241 to Lautzenhiser, et al, and assigned to the assignee hereof.

What remains needed in the art is an automatically variable rise height adjustment apparatus for use with semi-elliptical spring suspensions, which, in a particular form, is operatively responsive to vehicle ride conditions.

SUMMARY OF THE INVENTION

The present invention is an automatically variable rise height adjustment apparatus for use with semi-elliptical spring suspensions which may provide operative response based upon sensed vehicle ride conditions.

The automatically variable rise height adjustment apparatus according to the present invention may interface with, and utilize, selected mechanical components of the above described manual variable rise height adjustment apparatus, or may utilize other mechanical components. Generally in this regard, the automatically variable rise height adjustment apparatus includes a drive member composed of a rotatively driven component and at least one stationary component, as for example a stud interconnected with a suspension attachment member, as for example a control arm, and a threaded collar of a semi-elliptical spring interfaced with the threaded stud, wherein one of the threaded stud and the threaded collar is the rotatively driven component and the other is the at least one stationary component.

At least one electric motor powered by the vehicle electrical system is connected to the rotatively driven components via drive links, such as for example a flexible drive cables. In this regard, the motor turns the rotatively driven component of each of the front wheel corners via dual drive links, and/or similarly drives the drive members of the rear wheel corners if so equipped. While one motor can drive all the rotatively driven components via respective drive links, a motor allocated, respectively, to each of the front and rear wheel corners allows for front-to-rear level adjustment as well as height (ground clearance) adjustment.

The goal of the present invention is to provide automatic selection of vehicle ground clearance for motor vehicles with semi-elliptical spring suspensions, wherein an operator may select a height preference by operation of a switch, or a controller (i.e., computer) may provide a range of height selections based upon an algorithm which is responsive to sensed vehicle ride conditions, as for example vehicle speed, to optimize vehicle performance. For example, an operator may select a favorite vehicle body ride height which is high, medial or low and yet avoids driveway apron scrapping due to steep approach and departure angles. Further for example, a computer may be programmed to lower the vehicle body for a high speed ride condition (by nonlimiting example speeds above about 30 MPH), place the vehicle height at a medial level for a moderate speed ride condition (for nonlimiting condition between about 10 MPH and 30 MPH), and raise the body for a slow speed ride condition (for nonlimiting example below about 10 MPH). Lowering the body relative to the ground to improve aerodynamics and fuel economy at a high speed ride condition by rotating the rotatively driven components so that the semi-elliptical springs are less spaced from the suspension attachment members, and raising the body relative to the ground by rotating the rotatively driven components so that the semi-elliptical springs are more spaced from the suspension attachment members to provide clearance of driveway ramp angles at a slow speed ride condition.

Accordingly, it is an object of the present invention to provide an automatically variable rise height adjustment apparatus for use with semi-elliptical spring suspensions which may provide operative response based upon sensed vehicle conditions.

This and additional objects, features and advantages of the present invention will become clearer from the following specification of a preferred embodiment.

BRIEF DESCRIPTION OF THE DRAWINGS

FIGS. 2A through 2C are schematic views of height adjustments utilizing the manually variable ride height adjustment apparatus of FIGS. 1 and 2.

FIG. 3 is a schematic diagram of a semi-elliptical spring suspension equipped with an automatically variable ride height adjustment apparatus according to the present invention.

DESCRIPTION OF THE PREFERRED EMBODIMENT

Figure 1:
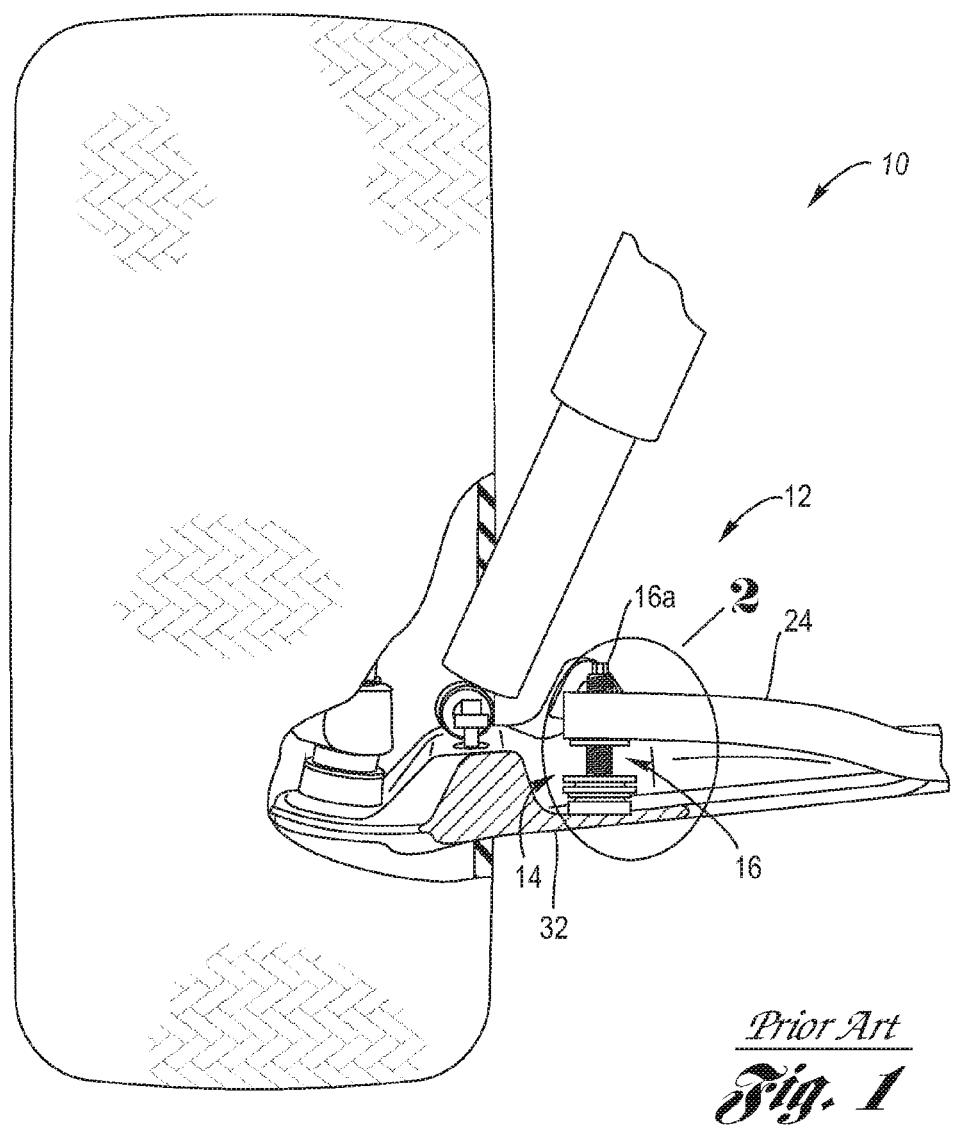
FIG. 1 is a partly broken-away, partly sectional front view of a wheel corner featuring a prior art manually variable ride height adjustment apparatus.
Figure 2:
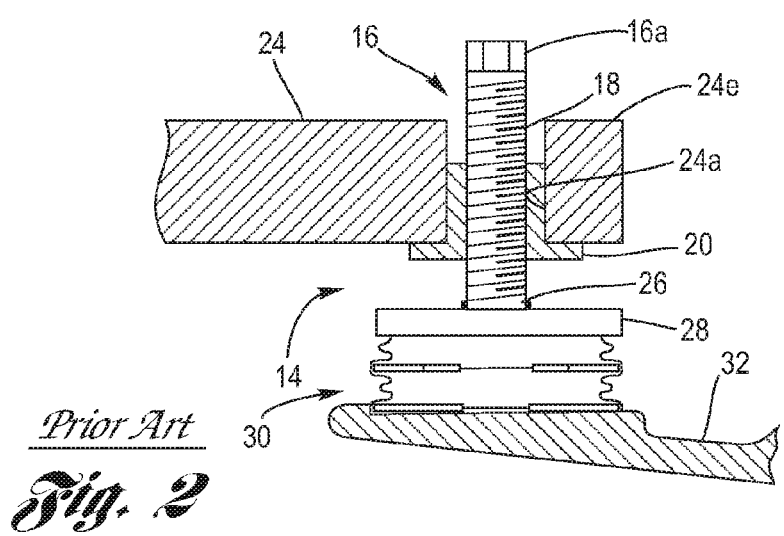
FIG. 2 is a detail sectional view seen at circle 2 of FIG. 1.

Referring now to the Drawing, FIGS. 3 through 5B depict various aspects of an automatically variable ride height adjustment apparatus 100 according to the present invention.

At FIG. 3, a motor vehicle 102 has a semi-elliptical spring suspension 104 at each front wheel corner 106f and each rear wheel corner 106r, each including, respectively, a semi-elliptical spring 108 and a suspension attachment member 110, which may for example be a control arm or other component. A switch 112 is provided for a driver of the vehicle to activate the automatically variable ride height adjustment apparatus 100, wherein if no controller (computer, electronic control module, etc.) is present, then the switch directly, via control line(s) 112a, operates the motor(s) 114 of the automatically variable ride height adjustment apparatus, via one or more drive lines 118, which motor(s) are connected to the drive member 116 of the automatically variable ride height adjustment apparatus at each wheel corner by a drive link 120, such as for example a flexible drive cable. In the event a pre-programmed controller 122 is provided, the switch 112 merely sets, via a control line 112b (control lines 112a being absent), the activation status of the automatically variable ride height adjustment apparatus 100, and sensor(s) 124, for example a speed sensor, via data line 126, provides data to the controller which, according to its pre-programmed algorithm, selectively actuates the motor(s) 114 so as to adjust the drive members 116.

While in FIG. 3 front and rear wheel corners 106f, 106r each have respective drive members 116, the drive members may be present only at the front or at the rear wheel corners, and only one motor 114 may be used even if both the front and rear wheel corners have drive members.

Figure 4:
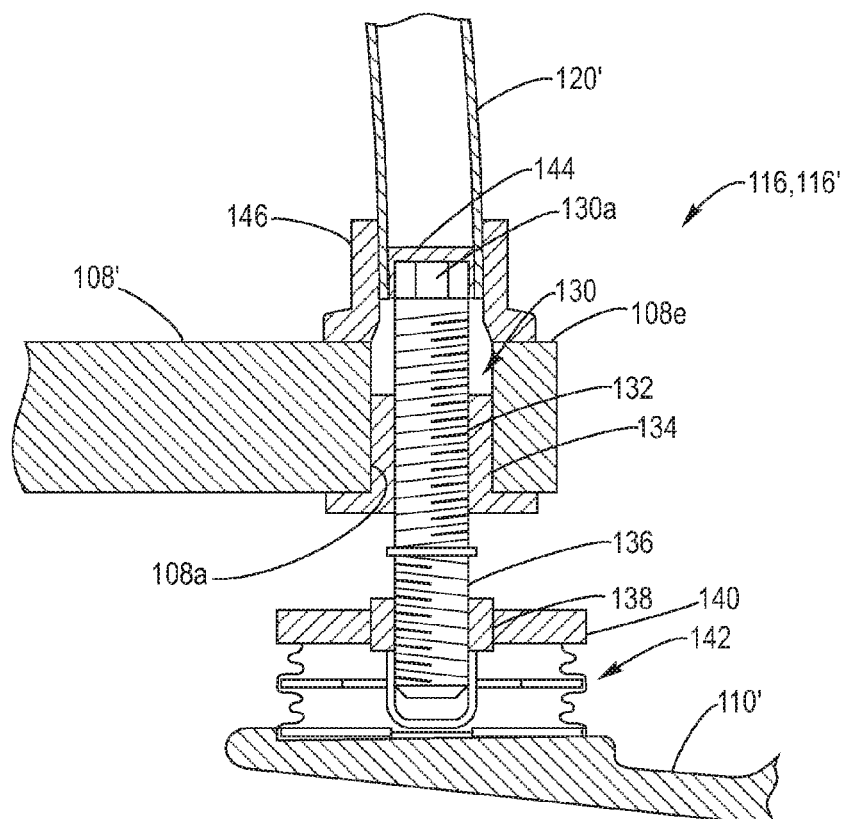
FIG. 4 is a sectional detail side view of a drive member of an automatically variable ride height adjustment apparatus according to a first example of the present invention.
Figure 5:
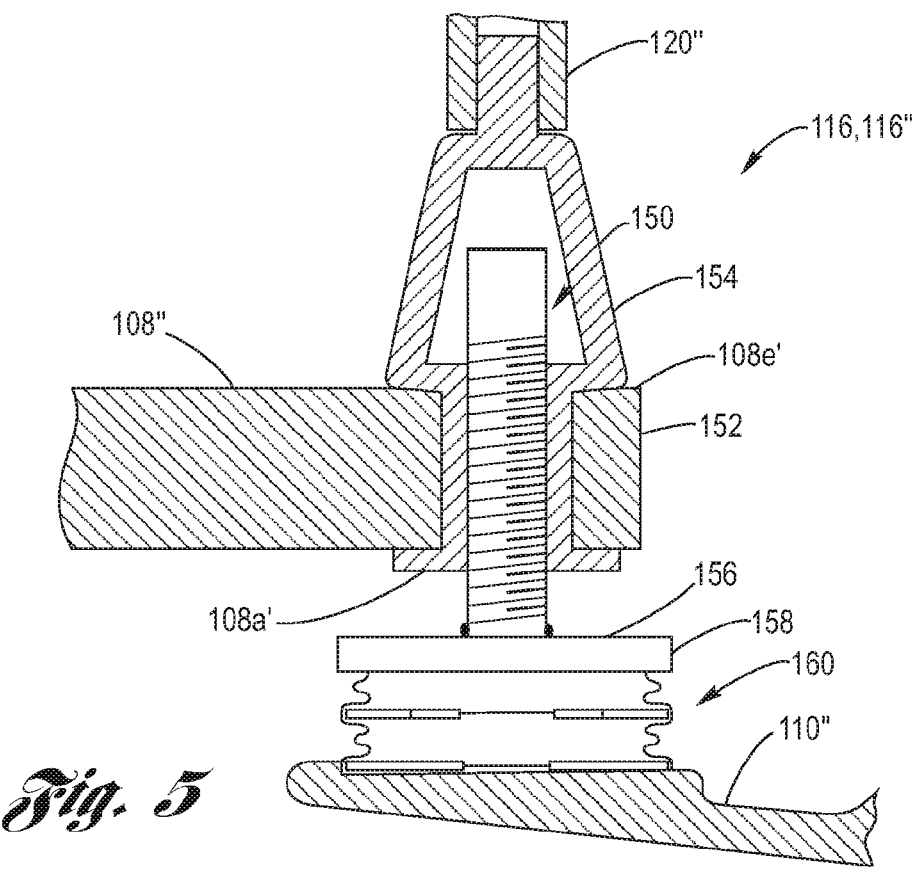
FIG. 5 is a sectional detail side view of a drive member of an automatically variable ride height adjustment apparatus according to a second example of the present invention.

FIGS. 4 and 5 depict examples of drive members 116 of the automatically variable ride height adjustment apparatus 100, wherein it is to be understood that other, differently constructed drive members may be utilized by artisans of ordinary skill in the art to provide height adjustment of the semi-elliptical springs relative to the suspension attachment members.

As shown at FIG. 4, a first example of a drive member 116, 116' is depicted which utilizes a double-threaded (i.e., opposed directions of threading) stud 130 having a multi-faced drive head 130a, wherein a first set of stud threads 132 is threadably engaged with a threaded spring collar 134 which is connected to a distal end 108e of the elliptical spring 108' at an aperture 108a formed therein, and a second set of stud threads 136 is threadably engaged with a threaded pad collar 138 which is non-rotatably connected with a pad collar 140 of a spring tip pad 142, which is, in turn, connected to a suspension attachment member 110'. The drive head 130a is drivingly connected to a driver socket 144 disposed at the terminal end of a drive link 120'. A bushing 146 connected to the semi-elliptical spring provides location of the driver socket 144.

Figures 4A, 4B:
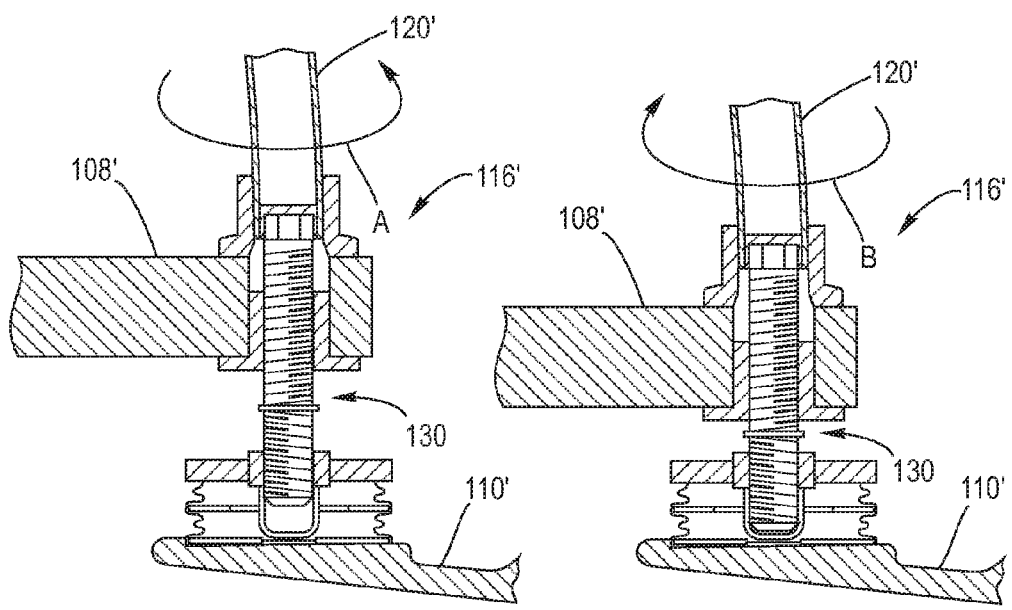
FIGS. 4A and 4B are schematic views of height adjustments utilizing the automatically variable ride height adjustment apparatus of FIG. 4.

Referring now additionally to FIGS. 4A and 4B, operation of the automatically variable ride height adjustment apparatus 100 with the second example of drive members 116' will be described.

To adjust from the medial position of the distal end of the semi-elliptical spring 108' with respect to the suspension attachment member 110' (FIG. 4), the switch 112 or controller 122 actuates at least one motor 114 and drives the drive links 120' so that the driver socket 144 rotates the double-threaded stud 130 with respect to each of the spring collar 134 and the pad collar 138, whereby rotation in one direction (arrow A of FIG. 4A) moves the elliptical spring a farther distance from the suspension attachment member, and rotation in the other direction (arrow B of FIG. 4B) causes the elliptical spring to be located a shorter distance from the suspension attachment member.

Referring now to FIG. 5, a second example of a drive member 116, 116" is depicted which utilizes a singly threaded stud 150, which may be, by way of example, in the form of the aforementioned threaded stud 24 with base 26. The stud threads 152 are threadably engaged with a threaded drive collar 154 which is rotatably disposed in an aperture 108a' of the elliptical spring 108" at the distal end 108e' thereof. The drive collar 154 is drivingly connected to a terminal end of a drive link 120" which connects to a motor 114. The threaded stud is rigidly and non-rotatably mounted by welding of the base 156 of the threaded stud 150 to a spring collar 158 of a spring tip pad 156, which is, in turn, connected to the suspension attachment member 110".

Figures 5A, 5B:
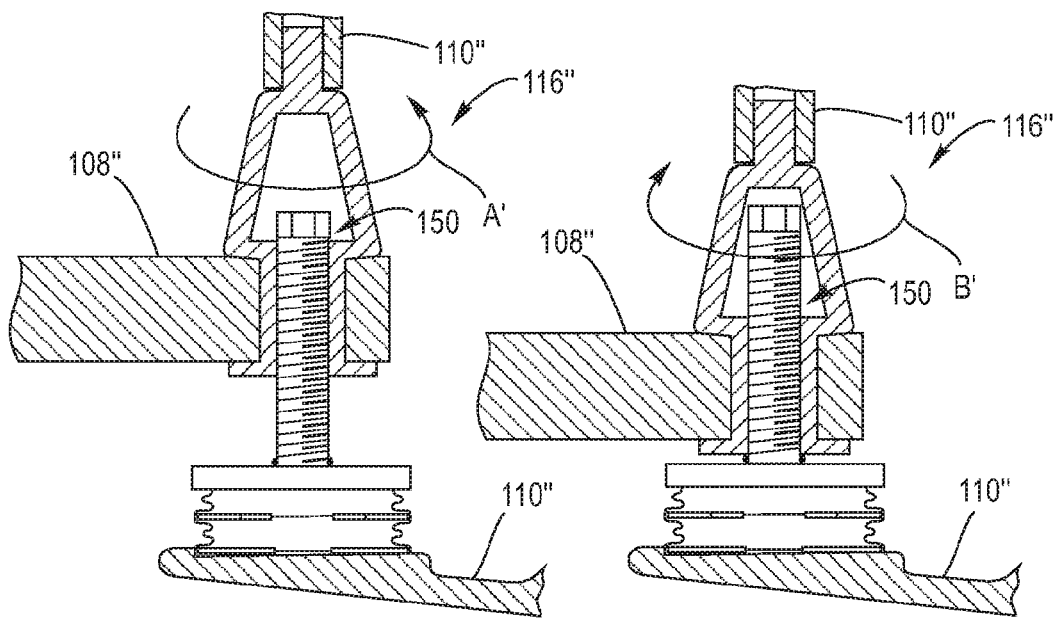
FIGS. 5A and 5B are schematic views of height adjustments utilizing the automatically variable ride height adjustment apparatus of FIG. 5.

Referring now additionally to FIGS. 5A and 5B, operation of the automatically variable ride height adjustment apparatus 100 with the second example of drive members 116" will be described.

To adjust from the medial position of the distal end of the semi-elliptical spring 108" with respect to the suspension attachment member 110" (FIG. 5), the switch 112 or controller 122 actuates at least one motor 114 and drives the drive links 120" so that the drive collar 154 rotates with respect to the threaded stud 150, whereby rotation in one direction (arrow A' of FIG. 5A) causes the elliptical spring 108" to move a farther distance from the suspension attachment member 110", and rotation in the other direction (arrow B' of FIG. 5B) causes the elliptical spring to be a shorter distance from the suspension attachment member.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. In a motor vehicle suspension system comprising a pair of front wheel corners and a pair of rear wheel corners, wherein at least one of the pairs of front and rear wheel corners comprises a suspension attachment member and a semi-elliptical spring having a distal end thereof attached to the suspension attachment member; wherein an improvement thereto comprises an automatically variable ride height adjustment apparatus, comprising:

at least one electric motor;

an actuation control for said at least one electric motor;

a plurality of drive links connected to said at least one electric motor; and a plurality of drive members, one drive member being respectively disposed at each wheel corner of the at least one pair of front and rear wheel corners that comprise a suspension attachment member and a semi-elliptical spring having a distal end thereof attached to the suspension attachment member, each drive member comprising:

a rotatively driven component connected drivingly to a respective said drive link; and at least one stationary component threadingly interfaced with said driven component;

wherein said driven component and said at least one stationary component are connected with the distal end of the semi-elliptical spring and the suspension attachment member such that when said at least one electric motor is actuated responsive to said actuation control, said plurality of drive links cause rotation of each said driven component relative to its respective said at least one stationary component, thereby resulting in a distance between the distal end of the respective semi-elliptical spring and the respective suspension attachment member to change responsive to the rotation.

2. The improvement of claim 1, wherein said actuation control comprises:

at least one ride condition sensor; and a controller electronically connected to said at least one ride condition sensor and said at least one electric motor;

wherein said controller selectively actuates said at least one motor to thereby adjust said distance in programmed response to data from said at least one ride condition sensor.

3. The improvement of claim 1, wherein each drive member further comprises:

said driven component comprising a double threaded stud having a first set of first directed threads and a second set of second directed threads; and said at least one stationary component comprising:

a threaded spring collar connected to the distal end of the semi-elliptical spring and threadingly engaged with said first set of threads; and a threaded pad collar connected to the suspension attachment member and threadingly engaged with said second set of threads.

4. The improvement of claim 3, wherein said actuation control comprises:

at least one ride condition sensor; and a controller electronically connected to said at least one ride condition sensor and said at least one electric motor;

wherein said controller selectively actuates said at least one motor to thereby adjust said distance in programmed response to data from said at least one ride condition sensor.

5. The improvement of claim 4, wherein one drive member is respectively located at each wheel corner of said front wheel corners.

6. The improvement of claim 4, wherein one drive member is respectively located at each wheel corner of said rear wheel corners.

7. The improvement of claim 4, wherein one drive member is respectively located at each wheel corner of said front and rear wheel corners.

8. The improvement of claim 1, wherein each drive member further comprises:

said driven component comprising a threaded spring collar connected to the distal end of the semi-elliptical spring; and said at least one stationary component comprising a threaded stud connected to the suspension attachment member and threadingly engaged with said threaded spring collar.

9. The improvement of claim 8, wherein said actuation control comprises:

at least one ride condition sensor; and a controller electronically connected to said at least one ride condition sensor and said at least one electric motor;

wherein said controller selectively actuates said at least one motor to thereby adjust said distance in programmed response to data from said at least one ride condition sensor.

10. The improvement of claim 9, wherein one drive member is respectively located at each wheel corner of said front wheel corners.

11. The improvement of claim 9, wherein one drive member is respectively located at each wheel corner of said rear wheel corners.

12. The improvement of claim 9, wherein one drive member is respectively located at each wheel corner of said front and rear wheel corners.

13. A method for automatically varying ride height of a motor vehicle, comprising the steps of:

providing a semi-elliptical spring and a suspension attachment component at each wheel corner of at least one of a pair of front wheel corners and a pair of rear wheel corners;

providing a drive member at each wheel corner of the at least one of the pair of front wheel corners and the pair of rear wheel corners;

actuating an electric motor;

rotating at each drive member a threaded driven component relative to at least one stationary component in response to the actuation of the electric motor to thereby cause distance variation between the semi-elliptical spring and the suspension attachment component.

14. The method of claim 13, wherein said step of actuating comprises:

sensing at least one ride condition of the motor vehicle; and selectively actuating the electric motor responsive to a controller output, said controller output being in response to an algorithm of the controller and the sensed at least one ride condition.

15. The method of claim 14, wherein said actuation of the motor in response to the controller output comprises:

increasing the distance with respect to a predetermined medial distance if the at least one sensed ride condition includes the motor vehicle speed being below a predetermined slow speed; and decreasing the distance with respect to the predetermined medial distance if the at least one sensed ride condition includes the motor vehicle speed being below a predetermined high speed.

16. The method of claim 15, wherein said steps of providing comprise:

providing a semi-elliptical spring and a suspension attachment component at each wheel corner of a pair of front wheel corners; and providing a drive member at each wheel corner of the pair of front wheel corners.

17. The method of claim 15, wherein said steps of providing comprise:

providing a semi-elliptical spring and a suspension attachment component at each wheel corner of a pair of rear wheel corners; and providing a drive member at each wheel corner of the pair of rear wheel corners.

18. The method of claim 15, wherein said steps of providing comprise:

providing a semi-elliptical spring and a suspension attachment component at each wheel corner of a pair of front wheel corners and a pair of rear wheel corners; and providing a drive member at each wheel corner.

* * * * *